United States Patent
Mitchell

(10) Patent No.: US 9,157,677 B2
(45) Date of Patent: Oct. 13, 2015

(54) REFRIGERATOR WATER FILTER ASSEMBLY

(75) Inventor: Alan Joseph Mitchell, Louisville, KY (US)

(73) Assignee: General Electric Company, Schenectady, NY (US)

(*) Notice: Subject to any disclaimer, the term of this patent is extended or adjusted under 35 U.S.C. 154(b) by 1224 days.

(21) Appl. No.: 12/858,236

(22) Filed: Aug. 17, 2010

(65) Prior Publication Data

US 2012/0042677 A1   Feb. 23, 2012

(51) Int. Cl.
| | | |
|---|---|---|
| F25D 23/12 | (2006.01) | |
| B01D 27/14 | (2006.01) | |
| B01D 29/56 | (2006.01) | |
| B01D 35/153 | (2006.01) | |

(52) U.S. Cl.
CPC ............ *F25D 23/126* (2013.01); *B01D 27/146* (2013.01); *B01D 29/56* (2013.01); *B01D 35/153* (2013.01); *B01D 2201/307* (2013.01); *F25D 2323/121* (2013.01)

(58) Field of Classification Search
CPC   F25D 2323/121; B01D 27/146; B01D 29/56; B01D 35/153; B01D 2201/307
USPC .................................. 62/318, 389
See application file for complete search history.

(56) References Cited

U.S. PATENT DOCUMENTS

| | | | |
|---|---|---|---|
| 5,715,699 A | | 2/1998 | Coates et al. |
| 5,798,040 A | * | 8/1998 | Liang ............................. 210/232 |
| RE37,216 E | | 6/2001 | Koslow |
| 6,337,015 B1 | * | 1/2002 | Poirier .......................... 210/232 |
| 6,939,470 B2 | * | 9/2005 | Baarman et al. ............... 210/739 |
| 7,491,327 B2 | | 2/2009 | Jenkins, Jr. et al. |
| 2003/0024860 A1 | * | 2/2003 | Fritze ............................. 210/97 |
| 2007/0012611 A1 | * | 1/2007 | An ................................. 210/232 |
| 2007/0278141 A1 | | 12/2007 | Patera et al. |
| 2011/0284096 A1 | * | 11/2011 | Coleman .................... 137/15.01 |

* cited by examiner

*Primary Examiner* — Benjamin Kurtz
(74) *Attorney, Agent, or Firm* — Dority & Manning, P.A.

(57) ABSTRACT

A water filter assembly including a water filter housing and a manifold coupled to the water filter housing. The manifold includes an inlet and an outlet. Filters are disposed in the water filter housing. The water filter assembly has a door. The door is disposed on the water filter housing providing selective access to the water filter housing. The door is connected to the water filter housing to open and close to replace the plurality of filters. The water filter assembly also has a valve associated with at least one of the plurality of filters. The valve is manipulated from an opened to a closed position to close the inlet when the filters are removed from the water filter housing.

13 Claims, 7 Drawing Sheets

REFRIGERATOR WATER FILTER ASSEMBLY

BACKGROUND OF THE INVENTION

The present disclosure relates generally to a water filter assembly. More particularly, the present disclosure relates to a water filter assembly that is hidden from view on an exterior surface of a refrigerator and that includes multiple filters disposed in a cartridge that can be easily replaced.

A refrigerator typically includes a water dispenser that dispenses filtered water from a water source. Sometimes the water dispenser is placed in a door of the refrigerator. The user takes a glass and pushes a lever or actuates a button to dispense filtered and chilled water. After a period of time, the filter associated with the water dispensing assembly is required to be replaced with a fresh filter as the prior filter becomes accumulated with impurities. Some configurations place the water filter assembly in an interior of the refrigerator. This configuration is disfavored as placing the water filter assembly in the interior of the refrigerator reduces the overall volume of storage space of the refrigerator. Additionally, a heating device may be required if the water filter assembly is located in the interior since ducting is needed to circulate water to and from the water filter assembly and the filtered water in the ducting may freeze if placed too close to the freezer compartment. Moreover, some other configurations will place the filter in an inconvenient location, such as a rear of the unit. The refrigerator is quite large and heavy usually and the user will be reluctant to move the refrigerator to access the rear. Also, by placing the water filter in the rear or in an area that is somewhat hidden, the user will not notice that the water filter requires replacement. Additionally, placing the water filter assembly in an interior location in the rear of the unit may even necessitate special tools to replace and open the water filter assembly to remove and replace the filter, which is disfavored and will discourage replacement.

There is a need in the art for a water filter assembly that can be quickly and easily replaced and that cuts the water supply to the water filter assembly during replacement. There is a need in the art for a water filter assembly where the water filter cartridge can be replaced in minutes to encourage replacement. There is also a need for a water filter assembly that has a narrow profile and that can be hidden from view when the refrigerator doors are closed. There is also a need for a water filter assembly that includes at least two filters in a narrow profile and that is disposed on an exterior surface and that does not take up any interior space of the refrigerator, which is highly valued. There is also a need for a water filter assembly that includes an easy and quick filter replacement functionality that does not require special tools. There is a further need for a water filter assembly that encourages replacement and does not require extensive instructions or removal of components of the refrigerator to access the water filter assembly.

BRIEF DESCRIPTION OF THE INVENTION

As described herein, the various exemplary embodiments of the present invention overcome one or more of the above or other disadvantages known in the art.

One aspect of the present disclosure relates to a water filter assembly including a water filter housing and a manifold coupled to the water filter housing. The manifold includes an inlet and an outlet. A plurality of filters are disposed in the housing. The water filter assembly also has a door. The door is disposed on the water filter housing to provide selective access to the interior of the water filter housing. The door is connected to the water filter housing to open and close to replace the plurality of filters. A valve is associated with at least one of the plurality of filters. The valve is manipulated from an opened to a closed position to close the inlet when the filters are removed from the water filter housing.

Another aspect of the present disclosure relates to a refrigerator including at least one storing compartment disposed in a refrigerator case having an exterior. The refrigerator also has a water dispenser associated with the refrigerator coupled to an external water source. The refrigerator also has a water filter assembly disposed between the water dispenser and the water source. The water filter assembly includes a water filter housing. The water filter housing is associated with the refrigerator case. The water filter assembly also has a manifold coupled to the water filter housing. The manifold includes an inlet and an outlet. At least two filters are disposed in the housing. The water filter assembly also has a door. The door is disposed on the water filter housing to provide selective access to the interior of the water filter housing. The door is connected to the water filter housing to open and close and to provide access to replace the plurality of filters. A valve is associated with at least one of the plurality of filters. The valve is manipulated from an opened to a closed position to close the inlet when the filters are removed from the water filter housing.

Another aspect of the present disclosure relates to a replaceable water filter cartridge. The replaceable water filter cartridge includes a housing and a first and a second filter cartridge component. The first and the second filter cartridge components are connected to one another with each of the first and the second filter cartridge components including a filter medium arranged therein. The first and the second filter cartridge components are in the housing. The replaceable water filter cartridge also has a handle connected to at least one of the first and the second filter cartridge components or connected to the housing. The replaceable water filter cartridge also has a cap at least partially surrounding at least one of the first or the second filter cartridge component. The replaceable water filter cartridge also has a male member connected to or associated with the cap to open and close a valve.

These and other aspects and advantages of the present disclosure will become apparent from the following detailed description considered in conjunction with the accompanying drawings. It is to be understood, however, that the drawings are designed solely for purposes of illustration and not as a definition of the limits of the disclosure, for which reference should be made to the appended claims. Moreover, the drawings are not necessarily drawn to scale and that, unless otherwise indicated, they are merely intended to conceptually illustrate the structures and procedures described herein.

DETAILED DESCRIPTION OF THE EXEMPLARY EMBODIMENTS OF THE INVENTION

It is contemplated that the teaching of the description set forth below is applicable to all types of refrigeration appliances, including but not limited to household refrigerators. The present disclosure is therefore not intended to be limited to any particular refrigeration apparatus or configuration described in the exemplary embodiments of the present disclosure. It should be appreciated that the present disclosure may also be applicable to other types of appliances that dispense water or fluid including commercial refrigerators, icemakers, filtered water bottlers, food manufacturing equipment, freezers, or any other type of appliance that may include a filtered water dispenser known in the art.

Figure 1:
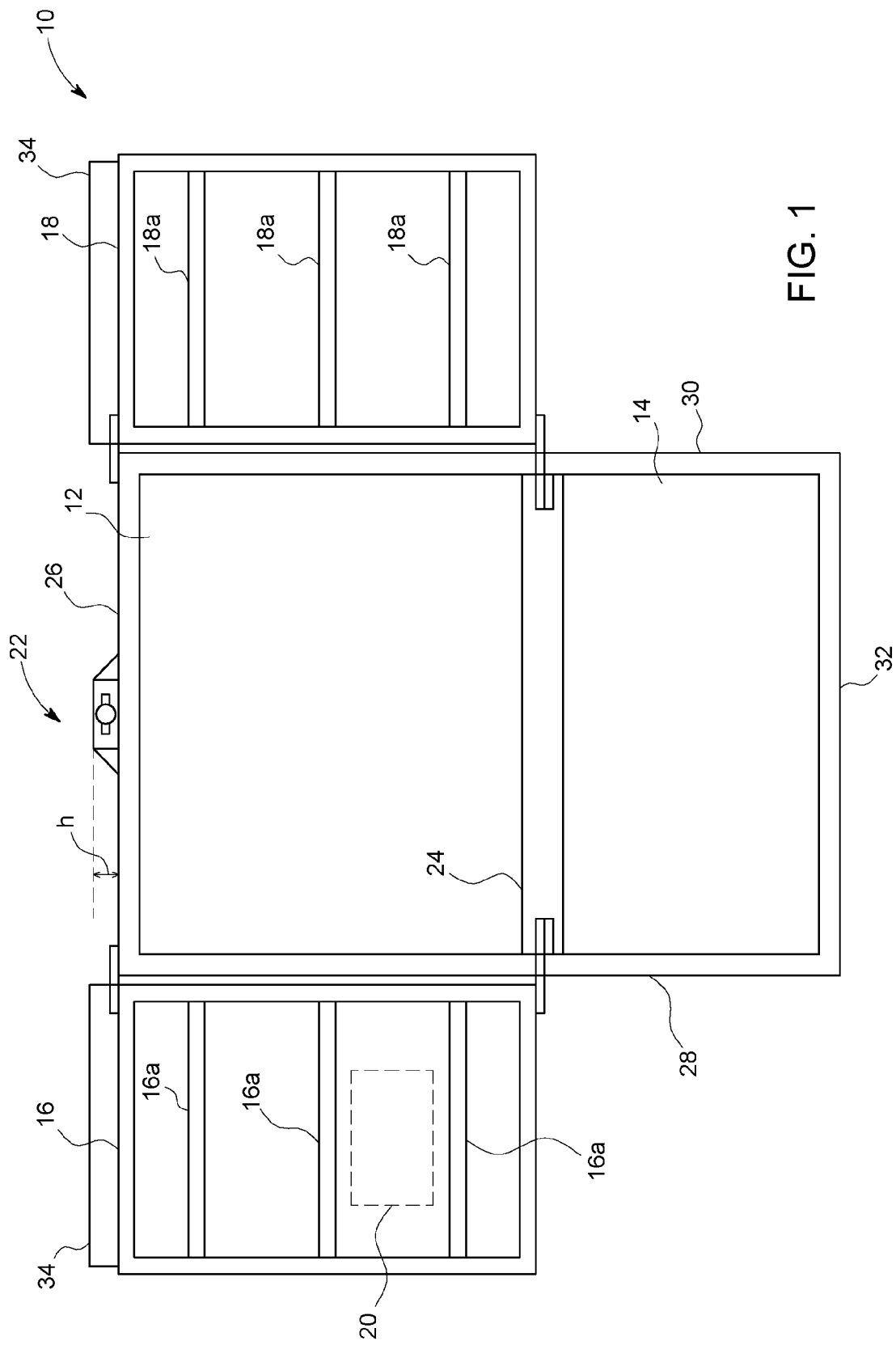
FIG. 1 is a perspective view of a refrigerator having a convenient water filter assembly disposed on an exterior of the refrigerator according to an exemplary embodiment of the present disclosure.

FIG. 1 illustrates a refrigerator 10 comprising at least one fresh food refrigeration compartment 12 and at least one freezer compartment 14 in a bottom-freezer configuration. Alternatively, the refrigerator 10 can be a different refrigeration configuration commonly referred to as a side-by-side arrangement or a top mount arrangement. The refrigerator 10 is shown with a first and a second door 16, 18 open exposing the interior of the fresh food storage compartment 12, having shelves 16a, 18a. The refrigerator 10 also has a water dispenser 20 arranged in at least one of the doors 16, 18. The water dispenser 20 preferably dispenses filtered water and includes a lever (not shown) and a tray (not shown) so the user may place a glass and push the lever to dispense the filtered water. The water dispenser 20 may also include a number of buttons, a clock and a light and may optionally dispense ice or crushed ice. Various dispenser configurations are known in the art and form no limitations to the present disclosure.

The present refrigerator 10 also comprises a water filtering assembly 22. The water filtering assembly 22 advantageously is not disposed in an interior 24 of the refrigerator compartment 12 or in an interior of the freezer compartment 14 to reduce an interior volume 24 of the refrigerator 10, but instead is disposed associated with an exterior surface 26 of the refrigerator 10. It is believed that this location is advantageous in that the location promotes changing the water filter. FIG. 1 shows the water filtering assembly 22 being shown on a top exterior surface 26 of the refrigerator, however, this location is merely illustrative of one embodiment and the water filter assembly 22 may be disposed in other locations on the exterior surface 26, such as, for example on the lateral sides 28, 30 or bottom surface 32 (FIG. 7), or in a toe grill of the refrigerator 10. Notably, the water filter assembly 22 has a narrow height h such that the water filter assembly 22 is blocked from view by an overhang 34 of the doors 16, 18, when the doors 16, 18 are closed. The water filter assembly 22 is preferably compact in the vertical direction. This allows the water filter assembly 22 to be hidden behind the doors 16 and 18. By reducing the diameter of the filter cartridges 74 and 76 (shown in FIG. 4), more filtering media may be required as discussed below.

Figure 2:
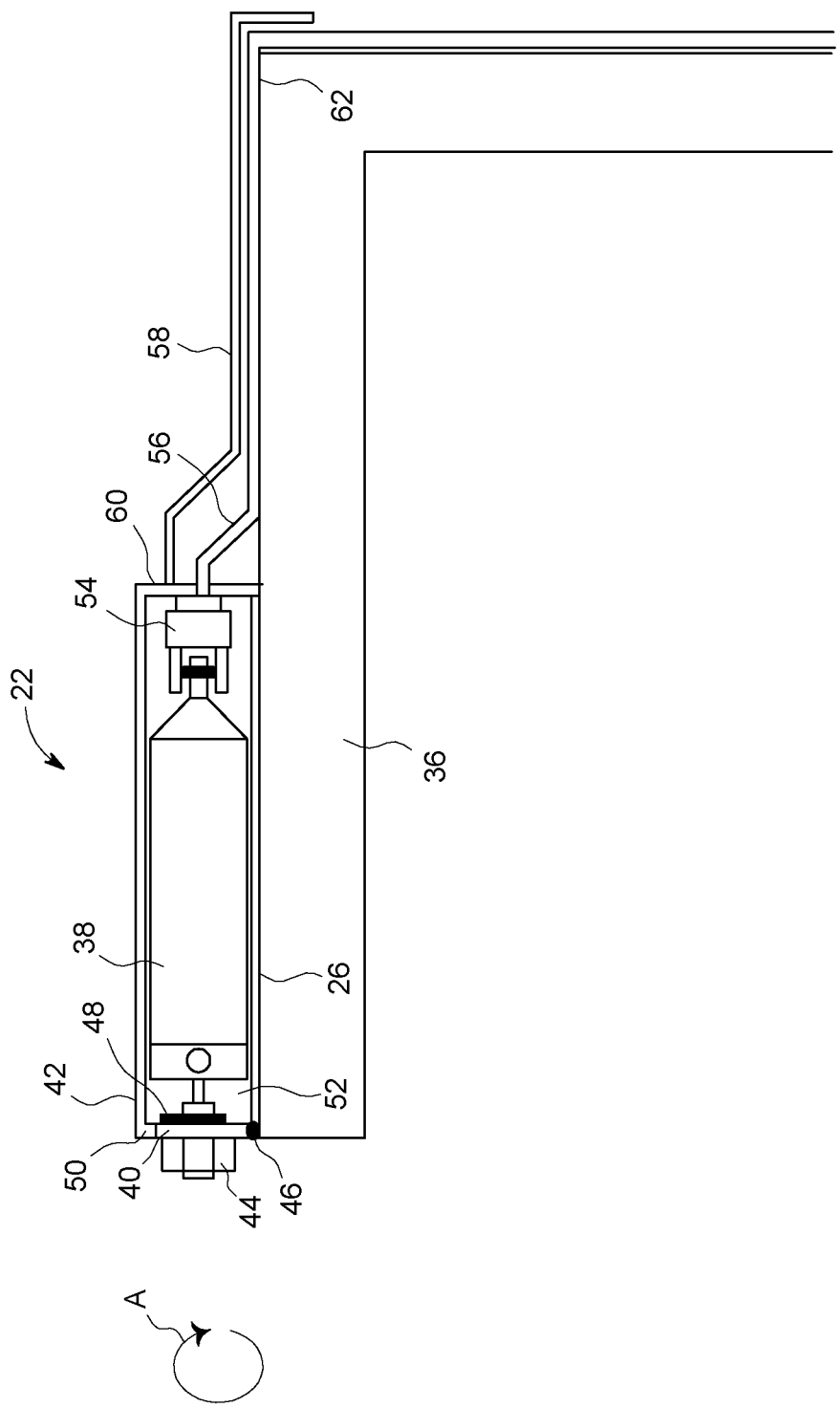
FIG. 2 is a right side view of the water filter assembly of FIG. 1 showing internal components with a door in a closed position and a water filter cartridge being connected to a manifold.
Figure 3:
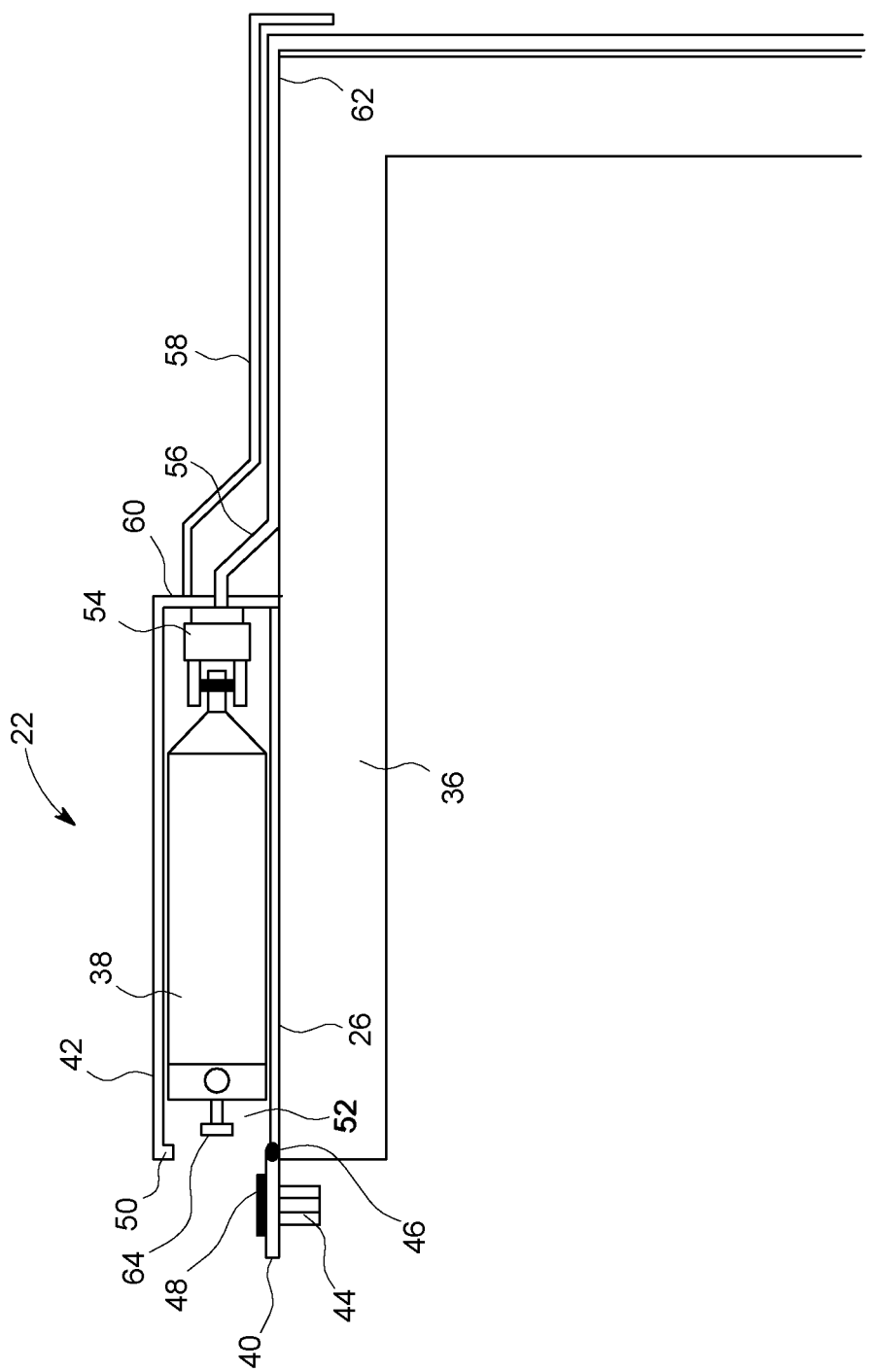
FIG. 3 is another right side view of the water filter assembly showing a door in an opened position with a water filter cartridge having a handle opposite the manifold.

Turning now to FIG. 2, there is shown a view of the water filter assembly 22 being disposed on a top exterior surface 26 of a refrigerator case 36. The water filter assembly 22 includes a water filter cartridge 38 disposed in a housing 42. The water filter assembly 22 also includes a door 40 that is pivot connected to housing 42 to allow access to the interior of housing 42. The door 40 includes a handle 44 and a pivot 46 that permits the door 40 to open and close as shown in FIGS. 2 and 3. Further, the door 40 engages with the housing 42 by a locking device 48. It should be appreciated that the pivot 46 may be replaced by a slidable track or hinge and forms no limitations to the present disclosure.

Figure 4:
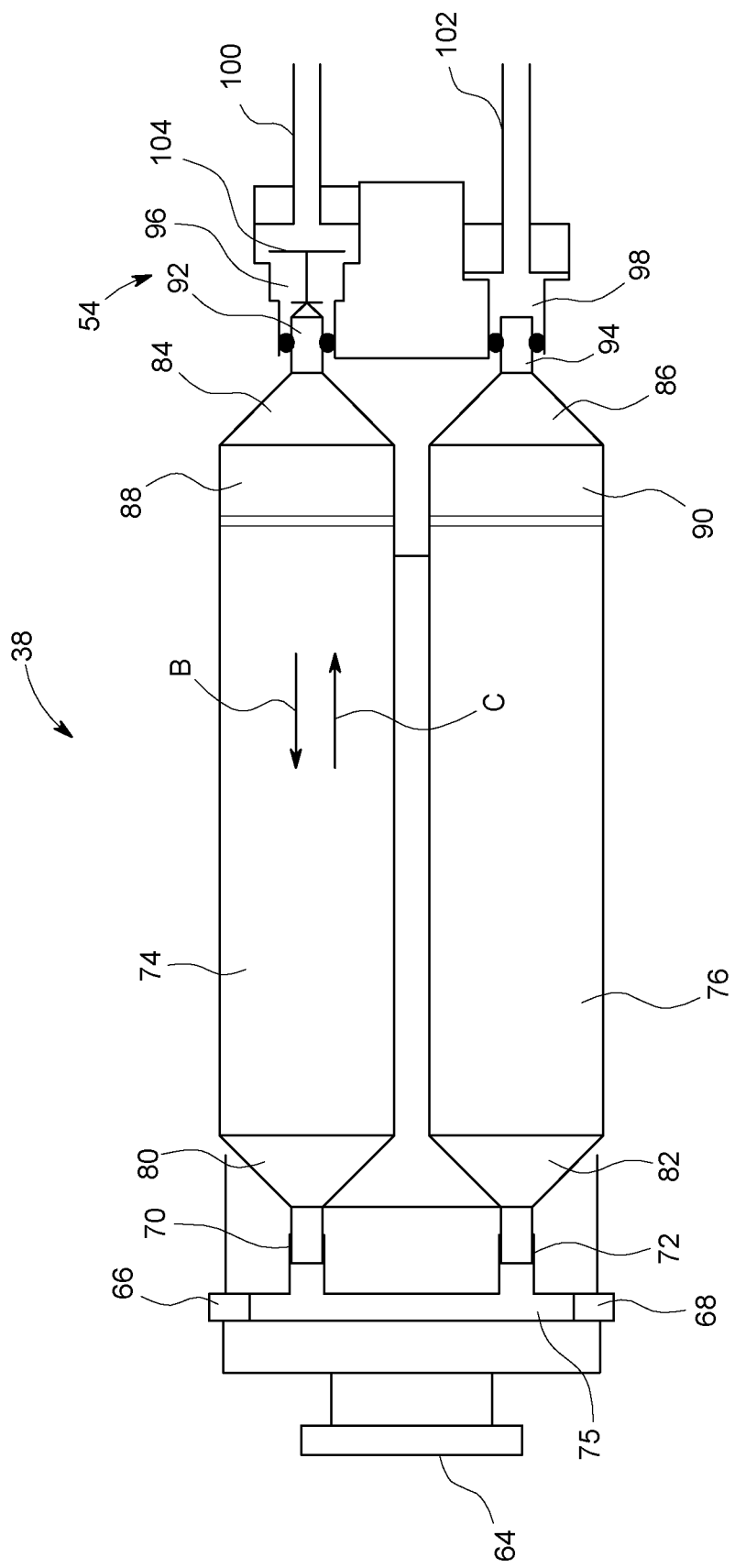
FIG. 4 shows an interior top side view of the filter cartridge having at least two filters that engage a check valve of the manifold to interrupt the water supply when the filter cartridge is removed.
Figure 5:
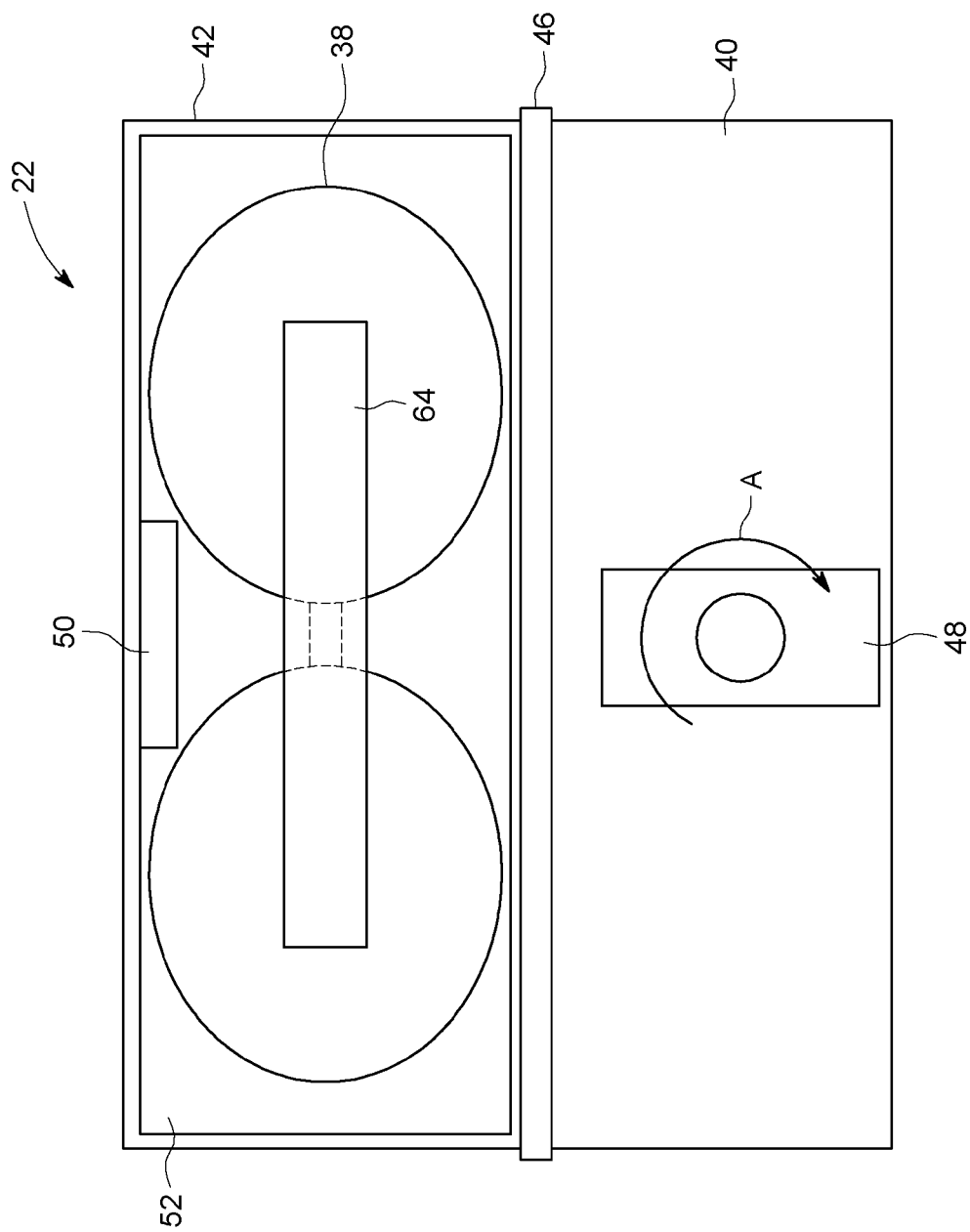
FIG. 5 is a front view of the water filter assembly showing the door in an opened position with a water filter cartridge having a lock opposite the manifold, which is in the rear of the water filter cartridge.

Turning now to a front view of the water filter assembly shown in FIG. 5, there is shown the door 40 opened and showing the filter cartridge 38 therein. Preferably, the handle 44 of FIG. 2 rotates in a clockwise and counterclockwise manner (as shown by arrow A), which rotates a latch 48. Latch 48 engages with an overhang 50 of the housing 42 to lock and unlock the door 40. In the closed and locked position of FIG. 2, the lock or latch 48 engages with the overhang 50 such that latch 48 prevents the door 40 from pivoting open about the pivot 46. In the opened and unlocked position of FIG. 3, the handle 44 rotates the latch 48 in a counterclockwise manner, which rotates the latch 48 out of engagement with the overhang 50 of the housing 42. This permits the door 40 to open about the pivot 46 shown in FIG. 3 and permits the user to access the interior space 52 of the housing 42 to replace the filters shown in FIG. 4 in the water filter cartridge 38. As shown on an opposite side of the water filter assembly 22, the water filter assembly 22 includes a manifold 54. Manifold 54 is preferably includes a pipe or section thereof that has several lateral outlets to or from other pipes to connect the inlet and outlet of the water filter cartridge 38 to the filtered and unfiltered water tubing 56 as discussed herein.

Water tubing 56 represents two separate water lines, an input line 100 and an output line 102 (FIG. 4). Tubing 56 can thus be two separate lines, or multi-lumen tubing. The input line 100 supplies water to the filter assembly from the external water source and the output line 102 supplies filtered water from the filter assembly to the water dispenser. The manifold 54 includes an inlet 96 which is connected to the input line allowing unfiltered water to flow into the water filter cartridge 38 and into the filters (FIG. 4). The manifold 54 also includes an outlet 98 which is connected to the output line allowing filtered water to exit the water filter cartridge 38 to supply the filtered water to the water dispenser 20 (FIG. 1). The water filter assembly 22 also comprises a protective covering 58. Covering 58 is a resilient sheet of material that extends from a housing edge 60 to the edge 62 of the refrigerator case 36 to protect the tubing 56. It should be appreciated that the protective covering 58 may be arranged in a different configuration, if the water filter assembly 22 is placed on a lateral refrigerator side 28, 30, or in or on a toe grill (not shown), or on the bottom surface 32 (FIG. 7) of the refrigerator 10. In an alternative embodiment, a third tube (not shown) may supply filtered water to an ice maker. It should be appreciated that the present disclosure may also extend to a commercial ice maker instead of a refrigerator or a filtered water bottle dispensing device.

As shown in FIG. 3, the water filter cartridge 38 includes a filter cartridge handle 64 shown in the interior space 52 to facilitate insertion and removal of the cartridge. The filter cartridge handle 64 is arranged on the water filter cartridge 38 on an opposite side of the water filter cartridge assembly 22 relative to the manifold 54. Preferably, when the door 40 is pivoted about the pivot 46 to the opened position of FIG. 3, the handle 64 is exposed from an interior space 52 of the housing 42. The user can then grip and pull the handle 64 and move the water filter cartridge 38 relative to the housing 42, which can be adhered to the case 36 or connected to case 36 by mechanical fasteners. Thus, the water filter cartridge 38 is removed and another second water filter cartridge can be slid into and installed inside the housing 42. Advantageously, when the water filter cartridge 38 is installed into or removed from the housing 42, the water filter cartridge 38 automatically turns on and off the supply of unfiltered water to the water filter cartridge 38 as discussed herein with FIG. 4.

Turning now to FIG. 4, there is shown a top cross sectional view of the water filter cartridge 38 of FIGS. 2-3 and 5 showing the interior components, which is placed in an interior space 52 of the housing 42 (FIG. 3) and that engages with the manifold 54. Preferably, the water filter cartridge 38 includes the filter cartridge handle 64 connected to a first and a second welded plugs 66, 68. The plugs 66, 68 are ultrasonically welded by welded portions 70, 72 to a first and a second filter 74, 76, which are components of the water filter cartridge 38 of FIG. 3. The first and the second filters 74, 76 are preferably cylindrically shaped and includes a conically shaped front side 80, 82 and a conically shaped rear side 84 and 86. The conically shaped rear side 84 and 86 of the first and the second filters 74 and 76 are formed from a pair of spin welded caps 88 and 90.

Figure 6:
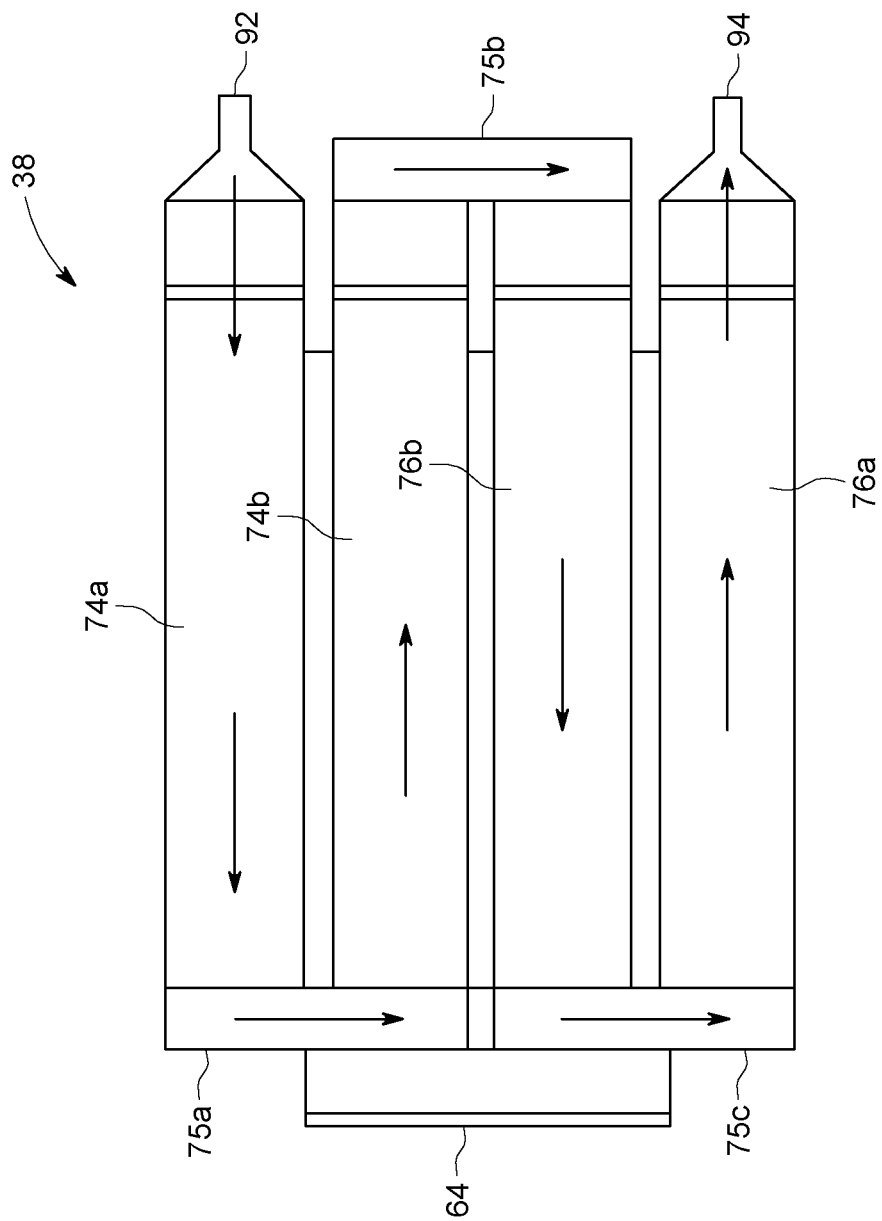
FIG. 6 shows an interior left side view of an alternative embodiment of the filter cartridge having at least four filters that engage a check valve of the manifold to interrupt the water supply when the filter cartridge is removed.

Each of the caps 88 and 90 preferably includes a male member 92, 94 that engages in the manifold assembly 54 by a first or inlet aperture 96 or a second or outlet aperture 98. The manifold 54 includes a water inlet line 100 that supplies unfiltered water from the external source into the inlet aperture 96 through the first cap 88 and into the first filter 74. The first filter 74 supplies the water to the second filter 76 by union 75; however, union 75 forms no limitation to the present disclosure and may be located in a different location, such as in a middle of the two filters 74 and 76. The water then flows through the second filter 76 through the second cap 90 and into the second aperture 98. The filtered water then traverses to a water outlet line 102. Water outlet line 102 supplies the filtered water to the filtered water tubing (not shown) and to the water dispenser 20 of FIG. 1, or alternatively to an ice maker or a refrigeration device to chill the water. Various appliance configurations are possible and within the scope of the present disclosure and the outlet 102 forms no limitations to the present disclosure. Water flows into one filter 74 and then the other filter 76, therefore the first and the second filters 74, 76 are in series, however this arrangement is not limiting and the filters 74, 76 may be arranged in parallel, or there can be many additional filter elements in a series of two, for example, the water filter cartridge 38 may include a first through fourth filters or more as shown in FIG. 6. Each of the first and the second filters 74, 76 can provide a different type of filtration, for removal of different types of impurities, for example, sediment, organics, metal reduction or even bacteria removal. Advantageously, the user can be assured of at least two stage filtration.

It should be appreciated that the water filter cartridge 38 is advantageously compact in the vertical direction. This low profile allows the cartridge assembly to be hidden behind the extended portion 34 of doors 16, 18 of FIG. 1. This is accomplished by combining two small diameter filters 74, 76 into one water filter cartridge 38. The first and the second filters 74 and 76 are each comprised of a body containing a cylindrical cavity, a union 75 that allows water to pass from one cavity to the other, and a filter media that is place inside the two cavities with at least two spin welded caps 88 and 90 that seal the two water filters 74 and 76. It should be appreciated that the filtering media can be any media known in the art for portable water filtration, such as for example, a surface filter, a solid sieve which traps the solid particles, with or without the aid of filter paper (e.g., Buchner funnel, belt filter, rotary vacuum-drum filter, cross flow filters), or a second depth filter (a bed of granular material which retains the solid particles as it passes).

Preferably, the manifold 54 includes a valve 104 disposed in the first aperture 96. However, this arrangement is not limiting and the valve 104 may be arranged in a different location. Valve 104 is preferably a check valve, however the valve 104 but can be a different type of valve. The valve 104 is generally disposed between the water inlet line 100 and the first cap 88. The valve 104 preferably is opened when the water filter cartridge 38 is installed. The valve 104 closes when the water filter cartridge 38 is removed for replacement. In this manner, water may not traverse through the first aperture 96 when no filter is present, such as during replacement of the water filter cartridge 38 and water may successfully traverse through the first aperture 96 when installation of the water filter cartridge 38 is complete. Preferably, when the water filter cartridge handle 64 is moved horizontally to remove the water filter cartridge 38 from the housing 42 of FIG. 3, the first cap 88 and male member 92 are also moved horizontally in the direction of arrow B shown in FIG. 4. Valve 104 is in contact with the male member 92 of the first cap 88.

When the first cap 88 and male member 92 are moved horizontally (direction arrow B), the first cap 88 is also moved in the direction of arrow B, thereby closing the valve 104. Valve 104 may be arranged with a spring (not shown) or the like to ensure movement. When the second or new water filter cartridge 38 is installed, the water filter cartridge 38 is moved horizontally in the opposite direction (direction of arrow C shown in FIG. 4) to introduce the water filter cartridge 38 and male member 92 into the housing 42 of FIG. 3. The first cap 88 and male member 92 is thus moved horizontally in the direction of arrow C. Valve 104 is in contact with the new first cap 88 and new male member 92. When the second new cap 88 is moved horizontally in the direction of arrow C, the male member 92 is also moved in the direction of arrow C, thereby opening the valve 104 and the water from the water inlet line 100 is permitted to be introduced again to the water filter cartridge 38.

In yet an alternative embodiment, the male member 92 does not need to contact the valve 104 to open the valve 104, but instead may contact an intermediate member (not shown), and the intermediate member may open and close the valve 104. Alternatively, the male member 92 may move and actuate a device to provide a signal to an electronic valve and the electronic valve may open and close in response to a signal. In yet an alternative embodiment, the opening and the closing of the door 40 may provide a signal to the electronic valve and the electronic valve may open and close in response to the signal. In yet a further embodiment, the water filter assembly 22 may also include a button that the user depresses to provide a signal to an electronic valve and the electronic valve may open and close in response to a signal. Various sensors may also be alternatively provided and arranged with the cartridge 38 to provide a signal to the valve.

The first and the second water filters 74 and 76 are circular in cross section and may include activated carbon. However, it should be appreciated that other shapes and media can be used. The cylindrical shape and configuration permits the first and the second water filters 74 and 76 to be arranged in a small footprint so as to be hidden from view by extension 34 when the doors 16 and 18 of FIG. 1 are closed.

In yet another embodiment, the water filter cartridge 22 can be arranged with three filters or more instead of two. Preferably, the filters can have different properties to remove different impurities from the water. In one example, the first filter 74 can remove a first impurity while the second, different filter 76 removes a different impurity. In yet another embodiment, the filter cartridge 38 may further include an indicator to provide the user with a signal that the water filter cartridge 38 requires replacement. The indicator can be a color indicator, a gauge type indicator, a flow rate indicator, electronic indicator or the housing 42 may be rendered transparent to view the filters 74, 76 for a visual inspection.

Filter media may include about three cubic inches or more of material. Two main types of filter media may be employed with the filter assembly 22, for example the media may include a surface filter, a solid sieve which traps the solid particles, with or without the aid of filter paper (e.g., Buchner funnel, belt filter, rotary vacuum-drum filter, cross flow filters), or a second depth filter (a bed of granular material which retains the solid particles as it passes). It should be appreciated that the filtered water may be directed into the refrigerator 10 to chill the filtered water, or to an ice maker to make ice for dispensing in a conventional manner.

FIG. 6 shows a side view of an alternative embodiment of a filter cartridge 38 according to the present disclosure. It should be appreciated that the present filter cartridge 38 is formed with more than two filters 74, 76 shown in FIG. 4 and includes a first through fourth filters 74a, 74b, 76a, and 76b. Preferably, the filter cartridge 38 includes a handle 64 to manipulate the filter cartridge 38 as discussed above and male members that serve as an inlet 92 and an outlet 94. In this embodiment, the filter cartridge 38 is formed with multiple unions 75a, 75b and 75c to receive and communicate water to the respective filters 74a, 74b, 76a, and 76b. Preferably, unfiltered water enters via inlet male member 92 and enters filter 74a. The water is filtered by filter 74a and communicated to the union 75a, and then the second filter 74b. The water is then filtered by filter 74b and communicated from the second filter 74b to the union 75b and to the third filter 76b. The water is then filtered by filter 76b and communicated to union 75c and then to the fourth filter 76a. The water is then filtered by filter 76a and communicated to the male member 94 and to the outlet and ultimately to the water dispenser or icemaker (not shown). It should be appreciated that each of the first through fourth filters 74a, 74b, 76a, and 76b may have different filtering media and may filter different impurities for superior filtering functionality as previously discussed.

Figure 7:
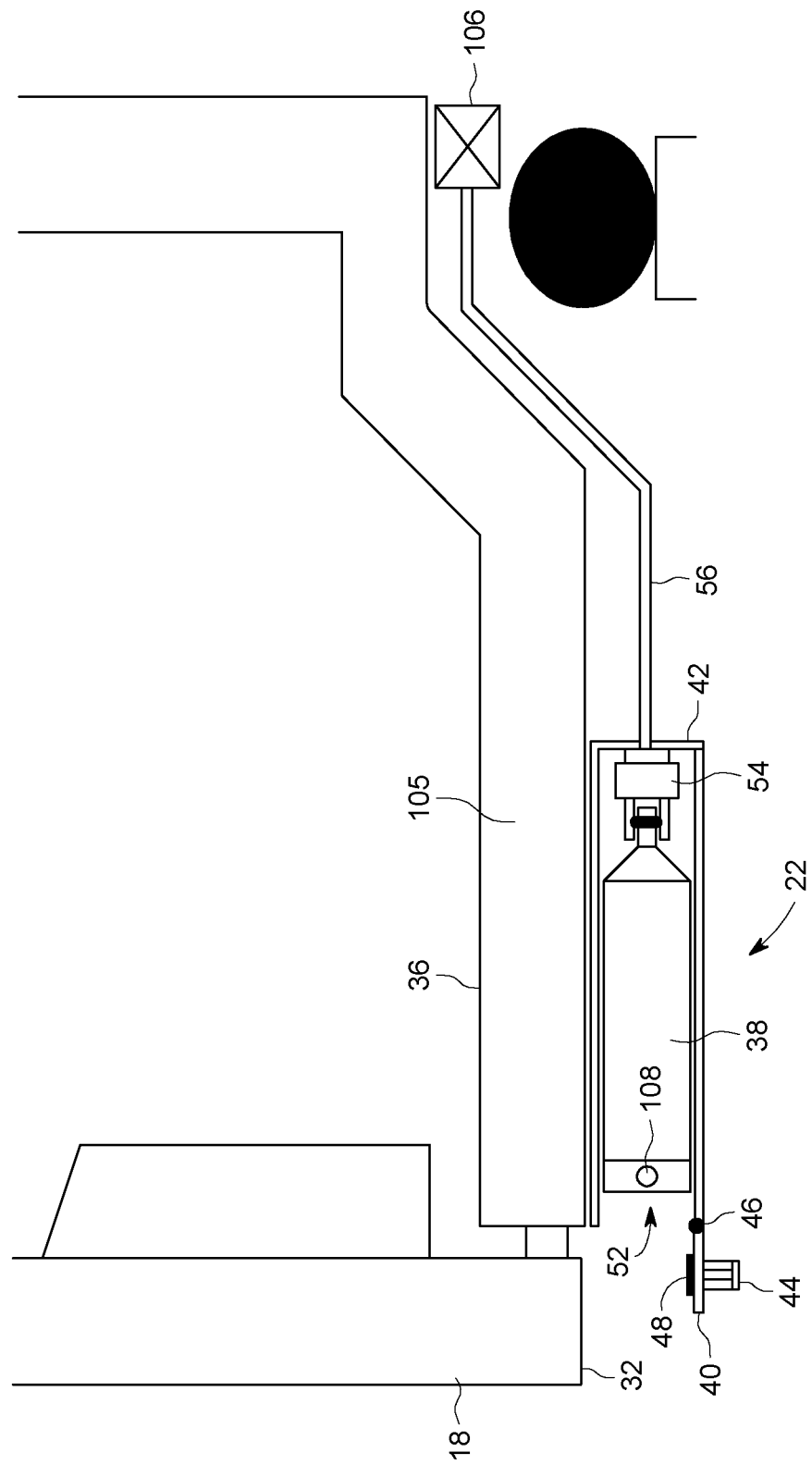
FIG. 7 shows a right side view of an alternative embodiment of the water filter assembly disposed under the refrigerator case and having an exterior electronic solenoid valve that is separated from the manifold.

FIG. 7 shows an alternative embodiment of the present disclosure where the water filter assembly 22 is associated with the bottom surface 32 of the refrigerator 10 under the door 18 and underneath a refrigerator deck 105. The water filter assembly 22 configuration of FIG. 7 shows a door 40 in the opened position with a handle 44 and a pivot 46. The water filter assembly 22 includes a cartridge filter 38 disposed in the housing 42, however the water filter assembly 38 includes a valve 106 being disposed on the outlet side of the manifold 54 and separated from the manifold 54. Preferably, the valve 106 can be an electronic solenoid valve. Alternatively, the valve may be a check valve. Other valve configurations are also possible and within the scope of the present disclosure.

The manifold 54 preferably allows unfiltered water to flow into the water filter cartridge 38 and the filters 74 and 76 (FIG. 4 or filters 74a-76b in FIG. 6). The manifold 54 also allows filtered water to exit the water filter cartridge 38 to supply the filtered water to the water dispenser 20 (FIG. 1). In a rear of the water filter assembly 22, the manifold 54 is connected to a tubing 56, which is connected to the valve 106 outside of the housing 42. In another alternative embodiment, the water filter assembly 22 may include a tube union with an electronic solenoid valve 106 inside the tube 56. This tube union with the valve 106 being inside the tube 56 is not a part of the manifold 54 but instead is a separate member.

As shown in FIG. 7, to replace the water filter cartridge 38 with a second fresh water filter cartridge, the water filter cartridge 38 includes a plug 108 shown in the interior space 52 with the handle 64 of FIG. 4 removed for illustration purposes. The plug 108 is arranged on the water filter cartridge 38 on an opposite side of the water filter cartridge assembly 22 relative to the manifold 54. The plug 108 preferably seals the water filter cartridge 38 and prevents water from flowing out of the water filter cartridge 38. When the door 40 is pivoted about the pivot 46 to the opened position of FIG. 7, a handle (not shown in FIG. 7) is exposed from the interior space 52 of the housing 42. The user can then manipulate the water filter cartridge 38 via the handle (not shown) and move the water filter cartridge 38 relative to the housing 42. Thus, the water filter cartridge 38 is removed and another second water filter cartridge 38 can be slid in and installed inside the housing 42. In this embodiment, the outlet tube is not shown that provides filtered water to a water tank for dispensing or to an icemaker (not shown). Valve 106 can be manipulated closed when the water filter cartridge 38 is removed from the housing 42 in a manner as previously described.

Thus, while there have shown and described and pointed out fundamental novel features of the disclosure as applied to various specific embodiments thereof, it will be understood that various omissions and substitutions and changes in the form and details of the apparatus illustrated, and in their operation, may be made by those skilled in the art without departing from the spirit of the disclosure. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A refrigerator comprising:
at least one storage compartment disposed in a refrigerator case having an exterior;
a water dispenser associated with the refrigerator and coupled to an external water source; and
a water filter assembly disposed between the water dispenser and the water source, the water filter assembly comprising:
a water filter housing associated with the refrigerator case;
a manifold coupled to the water filter housing, the manifold comprising an inlet and an outlet;
at least two filters disposed in the water filter housing;
a door disposed on the water filter housing providing selective access to the water filter housing so that the at least two filters can be replaced; and a valve associated with at least one of the at least two filters, the valve being manipulated from an opened to a closed position to close the inlet when at least one of the at least two filters are absent from the water filter housing, wherein the water filter assembly is disposed on an exterior, a top, a bottom, a toe grill, or on a side of the refrigerator case; and at least one refrigerator door, wherein the water filter assembly is hidden from view behind the refrigerator door on the exterior when the refrigerator door is closed and wherein the water filter assembly is accessible when the refrigerator door is opened.

2. The refrigerator of claim 1, wherein the inlet is coupled to tubing to receive fluid from the water source and the outlet is coupled to tubing to dispense filtered water to the water dispenser.

3. The refrigerator of claim 2, further comprising a cover disposed over the tubing, the cover being connected to the water filter housing opposite the door and extending from the housing to an edge of the exterior of the refrigerator.

4. The refrigerator of claim 1, wherein the at least two filters each are substantially cylindrically shaped with a longitudinal axis, wherein the at least two filters are arranged in a parallel configuration with the longitudinal axis of a first filter spaced from the longitudinal axis of a second filter, and wherein the at least two filters are fluidly connected to each other in series.

5. The refrigerator of claim 1, wherein the at least two filters comprise at least one cap that contacts the valve, wherein when the at least two filters are removed the at least one cap moves the valve to close the inlet of the manifold to prevent fluid from entering the at least two filters.

6. The refrigerator of claim 1, wherein the door comprises a handle, wherein the door is pivotally connected to the water filter housing and comprises a lock to prevent or allow access to the water filter housing, and wherein the handle can be rotated to lock or unlock the door to open and close the water filter housing.

7. The refrigerator of claim 1, wherein the at least two filters are disposed in a cartridge, the cartridge comprising a single cartridge filter handle, the single cartridge filter handle being on a same side as the door to allow the single cartridge filter handle to be accessed from the door to pull the cartridge out of the water filter housing.

8. The refrigerator of claim 7, wherein each of the at least two filters comprise a first end and an opposite second end, the at least two filters engaging the manifold proximate the first end and the single cartridge filter handle being proximate the opposite second end.

9. The refrigerator of claim 1, wherein the valve comprises an electronic valve and wherein the electronic valve opens and closes in response to a signal provided by configuring the door in the closed and opened positions, respectively.

10. The refrigerator of claim 1, wherein the water filter assembly further comprises a union, other than the manifold, fluidly connecting a first one of the at least two filters to a second one of the at least two filters.

11. The refrigerator of claim 10, wherein each of the at least two filters comprises a first end and an opposite second end, the at least two filters engaging the manifold proximate the first end and engaging the union proximate the opposite second end.

12. The refrigerator of claim 1, wherein at least one of the at least two filters comprises activated carbon.

13. The refrigerator of claim 1, wherein at least one of the at least two filters has different properties than at least another of the at least two filters and removes different impurities.

* * * * *